(12) United States Patent
Xue et al.

(10) Patent No.: US 11,123,254 B2
(45) Date of Patent: Sep. 21, 2021

(54) FINGER EXOSKELETON ROBOT

(71) Applicants: Beijing BOE Optoelectronics Technology Co., Ltd., Beijing (CN); BOE TECHNOLOGY GROUP CO., LTD., Beijing (CN)

(72) Inventors: Bangcan Xue, Beijing (CN); Yanjun Liu, Beijing (CN); Liguang Deng, Beijing (CN); Wenfeng Jin, Beijing (CN); Jian Bai, Beijing (CN); Xiaoliang Fu, Beijing (CN); Dong Zhang, Beijing (CN); Tao Jia, Beijing (CN); Zhehua Long, Beijing (CN); Jia Meng, Beijing (CN); Shuqian Dou, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 16/397,061

(22) Filed: Apr. 29, 2019

(65) Prior Publication Data
US 2020/0069504 A1    Mar. 5, 2020

(30) Foreign Application Priority Data
Aug. 31, 2018    (CN) .......................... 201811012606.1

(51) Int. Cl.
*A61H 1/02*    (2006.01)
*B25J 9/00*    (2006.01)

(52) U.S. Cl.
CPC .......... *A61H 1/0288* (2013.01); *B25J 9/0006* (2013.01); *A61H 2205/067* (2013.01)

(58) Field of Classification Search
CPC ................ A61H 1/0285; A61H 1/0288; A61H 2205/067; A61H 2205/065; B25J 9/0006
See application file for complete search history.

(56) References Cited

U.S. PATENT DOCUMENTS

2012/0029399 A1*  2/2012  Sankai ................ A61H 1/0288
                                                             601/40
2012/0136284 A1   5/2012  Land et al.
(Continued)

FOREIGN PATENT DOCUMENTS

CN    201283575        8/2009
CN    101797204 A      8/2010
(Continued)

OTHER PUBLICATIONS

1st Office Action dated Mar. 31, 2020 for Chinese Patent Application No. 201811012606.1.
(Continued)

*Primary Examiner* — Jerrah Edwards
*Assistant Examiner* — Aren Patel
(74) *Attorney, Agent, or Firm* — Thomas | Horstemeyer, LLP (57) ABSTRACT

A finger exoskeleton robot includes a support plate, at least one finger mechanism, and a temperature control system. Each of the finger mechanisms includes a plurality of finger sleeves and joint drivers. The sleeves of the finger mechanism are sequentially arranged at a distance and configured to be correspondingly worn on a plurality of knuckles of the user's fingers. Every two finger sleeves adjacent to each other of the finger mechanism are connected by one joint driver. The support plate and one of the finger sleeves closest to the support plate are connected by one joint driver. The joint driver is switched between a flat state and a curved state when the temperature of the joint drivers is higher than or lower than a phase change temperature value. A temperature (Continued)

control system is electrically connected to the respective joint drives and respectively controls the temperature of the joint drivers.

20 Claims, 4 Drawing Sheets

(56) References Cited

U.S. PATENT DOCUMENTS

| | | | |
|---|---|---|---|
| 2013/0296885 A1 | 11/2013 | Desai et al. | |
| 2016/0229635 A1* | 8/2016 | Summer | A61F 5/013 |
| 2018/0303698 A1* | 10/2018 | Wijesundara | F15B 15/10 |
| 2018/0335841 A1* | 11/2018 | Rubin | G06F 3/016 |
| 2019/0160658 A1* | 5/2019 | Hutter | B25J 9/126 |

FOREIGN PATENT DOCUMENTS

| | | | |
|---|---|---|---|
| CN | 103315880 | 9/2013 | |
| CN | 104887364 | 9/2015 | |
| CN | 105266798 | 1/2016 | |
| CN | 107158660 | 9/2017 | |
| CN | 108177156 | 6/2018 | |
| EP | 0421368 A1 * | 4/1991 | .......... A61H 1/0288 |
| JP | 2004106115 A | 4/2004 | |
| JP | 2004329490 | 11/2004 | |
| WO | 2004021936 | 3/2004 | |

OTHER PUBLICATIONS

Second Office Action for CN Patent Application No. 201811012606.1 dated Sep. 25, 2020.

Third Office Action for CN Patent Application No. 201811012606.1 dated Feb. 7, 2021.

* cited by examiner

FINGER EXOSKELETON ROBOT

CROSS REFERENCE TO RELATED APPLICATION

This application is based upon, and claims the benefit of and priority to, Chinese Patent Application No. 201811012606.1, filed on Aug. 31, 2018, where the entire contents thereof are incorporated herein by reference.

TECHNICAL FIELD

The present disclosure relates to a technical field of a medical rehabilitation instrument, and in particular to a finger exoskeleton robot.

BACKGROUND

Diseases such as hemiplegia generally include the symptom of hand stiffness, with a typical feature in that the fingers are in a bent and collapsed state. Over time, this certainly can cause muscle spasms and atrophy of the hand, which seriously affects daily life of the patient. However, presently, rehabilitation directed to the hands mainly includes a manual one-on-one massage activity training, which does not protect the strength and efficiency of rehabilitation, and also increases burden for medical workers. In addition, some injuries on the hand may further cause damage to peripheral nerve tissue, resulting in such phenomena as muscle weakness and atrophy, etc. in the hand muscles. If effective rehabilitation training activities are not carried out, the condition will worsen.

An existing hand rehabilitation training instrument is basically driven by a motor or a pneumatic cylinder. The instrument has a complicated structure, high price, large rigidity, and a risk for safety. As such, it is impossible to obtain a large-scale advancement, and a majority of patients cannot complete the daily rehabilitation training activity at home. Thus, it is urgent to develop an exoskeleton robot rehabilitation training device, which has a low cost, is highly targeted, and has notable safety, while being suitable for patients to complete daily rehabilitation training tasks at home.

SUMMARY

According to one aspect of the present disclosure, a finger exoskeleton robot is provided. The finger exoskeleton robot includes a support plate, at least one finger mechanism, and a temperature control system. The support plate is configured to be fixedly connected to the finger mechanism and worn on the back of a user's hand. Each of the finger mechanisms is configured to be worn on one of the user's fingers. Each of the finger mechanisms includes a plurality of finger sleeves and a plurality of joint drivers. The plurality of finger sleeves of each finger mechanism are sequentially arranged at a distance and configured to be correspondingly worn on a plurality of knuckles of the user's fingers. Every two finger sleeves adjacent to each other of the finger mechanism are connected by one joint driver. The support plate and one of the finger sleeves closest to the support plate are connected by one joint driver. The joint driver is configured to be switched between a flat state and a curved state when a temperature of the joint drivers is higher than or lower than a phase change temperature value. A temperature control system is electrically connected to the respective joint drives and configured to respectively control the temperature of the joint drivers.

According to one implementation of the present disclosure, the joint driver includes a connecting plate. The connecting plate is connected between the two finger sleeves adjacent to each other or connected between the support plate and one of the finger sleeves closest to the support plate, the connecting plate is made of a two-way shape memory alloy.

According to one implementation of the present disclosure, the joint driver also includes a flexible thermal insulation film. The flexible thermal insulation film is disposed on the lower surface of the connecting plate facing the user's finger.

According to one implementation of the present disclosure, the joint driver further includes an insulating layer. The insulating layer is disposed on the surface of the connecting plate.

According to one implementation of the present disclosure, the phase change temperature value is 40° C. to 50° C.

According to one implementation of the present disclosure, a first groove is opened on the lower surface of the support plate facing the back of the hand, a second groove opposite to the first groove is opened on the lower surface of the finger sleeve facing the finger of the finger mechanism adjacent to the support plate, and two ends of the joint driver are detachably fixed in the first groove and the second groove, respectively.

According to one implementation of the present disclosure, two second grooves are respectively opened on the lower surfaces of the opposite positions of the two finger sleeves adjacent to each other facing the fingers, and the two ends of the joint drivers are detachably fixed in the second grooves of the two finger sleeves, respectively.

According to one implementation of the present disclosure, each of the finger mechanisms further includes a sub-wiring harness electrically connected to the temperature control system. Each of the joint drivers has a positive electrode lead and a negative electrode lead, respectively, on the ends thereof, and the positive electrode lead and the negative electrode lead are respectively connected to the sub-wiring harness.

According to one implementation of the present disclosure, a first projection is protruded from an upper surface of the support plate facing away from the back of the hand, where a number and position of the first projection corresponds to that of the finger mechanism, and the sub-wiring harness of the finger mechanism is arranged through the corresponding first projection.

According to one implementation of the present disclosure, a second projection is protruded from an upper surface of the finger sleeve facing away from the finger, and the sub-wiring harness of each of the finger mechanisms is arranged through the plurality of the second projections of the finger mechanisms, and the positive electrode lead and the negative electrode lead of each of the joint drivers respectively pass through the finger sleeve, and are connected to the sub-wiring harness.

According to one implementation of the present disclosure, the support plate is provided with a splitter, and a main wiring harness is connected between the splitter and the temperature control system. The sub-wiring harnesses of the finger mechanisms are respectively connected to the splitter. The splitter is configured to selectively connect at least one of the plurality of sub-wiring harnesses to the main wiring harness.

According to one implementation of the present disclosure, the support plate is provided with a support plate strap through which the support plate is adjustably worn on the user's wrist.

According to one implementation of the present disclosure, the temperature control system includes a drive circuit, a power supply, and a controller. The drive circuit is electrically connected to the respective joint drivers, respectively. The power supply is electrically connected to the drive circuit. The power supply is configured to respectively heat the joint drivers through the drive circuit. The controller is electrically connected to the drive circuit and the power supply, respectively. The controller is configured to control the drive circuit to heat the joint drivers.

According to one implementation of the present disclosure, the temperature control system further includes a plurality of temperature sensors. The plurality of temperature sensors are correspondingly disposed in the plurality of the joint drivers. The temperature sensors are electrically connected to the controller to separately collect the temperature of the joint drivers. The controller is configured to control the drive circuit to heat the joint drivers according to the temperature of the joint drivers collected by the temperature sensors.

According to one implementation of the present disclosure, the power supply and the drive circuit are connected through a voltage reduction and regulation circuit and/or the power supply and the controller are connected through the voltage reduction and regulation circuit.

According to one implementation of the present disclosure, the temperature control system further includes a temperature control box. The temperature control box is configured to be worn on a use's wrist or arm. The drive circuit, the power supply, and the controller are disposed in the temperature control box.

According to one implementation of the present disclosure, the temperature control box is provided with a temperature control box strap through which the temperature control box is adjustably worn on the user's arm.

According to one implementation of the present disclosure, each of the finger mechanisms includes three of the finger sleeves and three of the joint drivers when the finger mechanisms correspond to any one of the user's index finger, middle finger, ring finger, and little finger. The three finger sleeves are respectively a proximal finger sleeve, a distal finger sleeve, and a finger end sleeve, which are sequentially arranged at a distance. The three joint drivers are respectively a palmar joint driver connected between the support plate and the finger sleeve, a proximal finger joint driver connected between the proximal finger sleeve and the distal finger sleeve, and a distal finger joint driver connected between the distal finger sleeve and the finger end sleeve.

According to one implementation of the present disclosure, the finger mechanism includes two of the finger sleeves and two of the joint drivers when the finger mechanism corresponds to the user's thumb. The two finger sleeves are respectively a proximal finger sleeve and a finger end sleeve, which are sequentially arranged at a distance. The two joint drivers are respectively a palmar joint driver connected between the support plate and the proximal finger sleeve and a distal finger joint driver connected between the finger end sleeve and the proximal finger sleeve.

According to one implementation of the present disclosure, the proximal finger sleeve includes a buckle plate and a finger sleeve strap. The buckle plate has a semi-tubular structure for buckling the knuckles of the user's fingers. The buckle plate is adjustably worn on the knuckles of the user's fingers through the finger sleeve strap.

According to one implementation of the present disclosure, the distal finger sleeve includes a buckle plate and a finger sleeve strap. The buckle plate has a semi-tubular structure for buckling the knuckles of the user's fingers. The buckle plate is adjustably worn on the knuckles of the user's fingers through the finger sleeve strap.

According to one implementation of the present disclosure, the finger end sleeve has a tubular structure for buckling the knuckle of the user's fingers.

BRIEF DESCRIPTION OF THE DRAWINGS

The various objects, features, and advantages of the present disclosure will be apparent from the following detailed description of the preferable implementations taken in conjunction with the accompanying drawings. The figures of the present disclosure are only illustrative, but not necessarily to scale. In the drawings, the same reference numbers will be used throughout the drawings to refer to the same or like parts.

The reference numbers are as follows:
100. support plate;
110. splitter;
120. support plate straps;
130. first groove;
140. first projection;
200. finger mechanism;
210. finger sleeve;
2101. proximal finger sleeve;
2102. distal finger sleeve;
2103. finger end sleeve;
211. buckle plate;
2111. second groove;
2112. first wire hole;
212. finger sleeve strap;
220. joint driver;
221. connecting plate;
2211. second wire hole;
231. sub-wiring harness;
232. second projection;
233. positive electrode lead;
234. negative electrode lead;
310. temperature control box;
311. temperature control box strap;
320. drive circuit;
330. power supply;

340. controller;
350. temperature sensor;
360. voltage reduction and regulation circuit;
400. main wiring harness.

DETAILED DESCRIPTION

Typical embodiments embodying features and advantages of this disclosure will be set forth in detail. It should be understood that various modifications may be made with respect to different embodiments of this disclosure without departing from the scope of this disclosure, where the description and drawings are used for description while not limiting the disclosure.

Hereinafter, various example embodiments of the present disclosure will be described with reference to the drawings constituting a part of the present disclosure, in which different example structures, systems, and steps of various aspects of the present disclosure can be realized in an example. It should be understood that other specific technical solutions of the components, structures, example devices, systems, and steps may be used and can be structurally and functionally modified without departing from the scope of the present disclosure. Moreover, although the terms "between", "center", "outside", etc. may be used in this specification to describe different example features and elements of the present disclosure, these terms are used herein only for convenience, for example, as an example direction described according to the drawings. It should not be understood from any content of the specification that particular three-dimensional direction requiring a structure falls within the scope of the present disclosure.

The present disclosure provides a finger exoskeleton robot, which is simple in structure, light, safe, and includes better adaptability.

Figure 1:
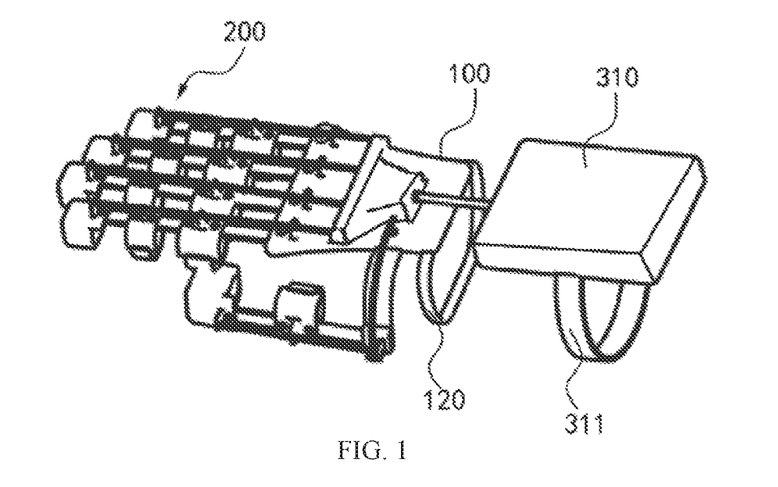
FIG. 1 is a schematic structural view of an exoskeleton robot as shown according to an example implementation.

Referring to FIG. 1, a schematic structural view of an exoskeleton robot is shown as proposed by the present disclosure. In the example implementation, the exoskeleton robot proposed by the present disclosure is illustrated as an example of a medical instrument applied to treat symptoms, such as hand stiffness. Those skilled in the art would readily appreciate that many modifications, additions, substitutions, deletions, and other changes may be made to the specific implementations, and such changes are contemplated by the principle of exoskeleton robot as proposed by this disclosure.

As shown in FIG. 1, in this implementation, the finger exoskeleton robot proposed by the present disclosure mainly includes a support plate 100, five finger mechanisms 200, and a temperature control system. With reference to FIG. 2 to FIG. 9, a schematic structural view of the exoskeleton robot in another view capable of embodying the principle of the present disclosure is representatively shown in FIG. 2. A schematic structural view of the finger mechanisms 200 of the exoskeleton robot capable of embodying the principle of the present disclosure is representatively shown in FIG. 3. A schematic structural view of the support plate 100 of the exoskeleton robot capable of embodying the principle of the present disclosure is representatively shown in FIG. 4. A schematic structural view of the support plate 100 in another view as shown in FIG. 4 is representatively shown in FIG. 5. A schematic structural view of the exoskeleton robot having a joint driver 220 in a flat state, capable of embodying the principle of the present disclosure is representatively shown in FIG. 6. A schematic structural view of a joint driver 220 of the exoskeleton robot having a joint driver 220 in a curved state, capable of embodying the principle of the present disclosure is representatively shown in FIG. 7. A schematic structural view of a finger sleeve 210 of the exoskeleton robot capable of embodying the principle of the present disclosure is representatively shown in FIG. 8. A control principle diagram of the exoskeleton robot capable of embodying the present disclosure is representatively shown in FIG. 9. The structure, mode of connection, and functional relationship of the main components of the exoskeleton robot as proposed by the present disclosure will be described in detail below with reference to the drawings.

Figure 2:
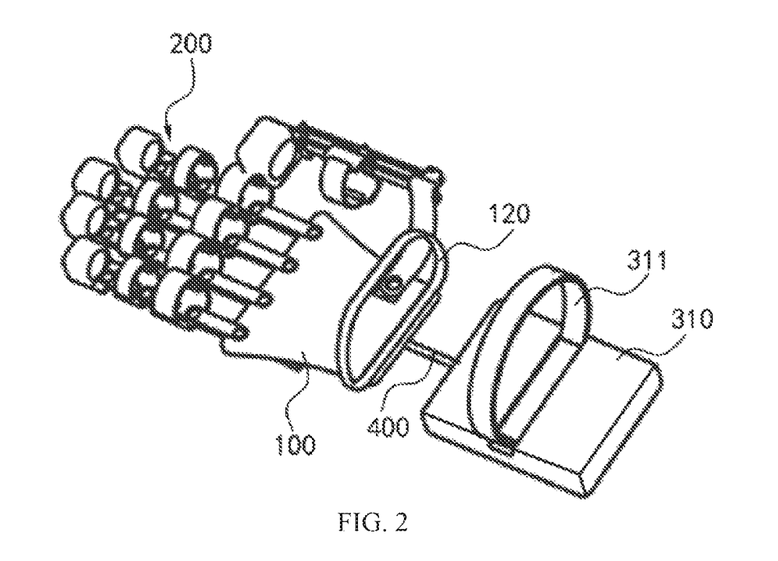
FIG. 2 is a schematic structural view of the exoskeleton robot in another view as shown in FIG. 1.

As shown in FIG. 1 and FIG. 2, in this implementation, the support plate 100 is fixedly connected to the respective finger mechanisms 200 and is worn on the back of a user's hand. A splitter 110 is arranged on the support plate 100. A main wiring harness 400 is connected between the splitter 110 and the temperature control system. The sub-wiring harness 231 of each of the finger mechanisms 200 is respectively connected to the splitter 110. Accordingly, the splitter 110 may selectively connect at least one of the plurality of sub-wiring harnesses 231 to the main wiring harness 400 according to different requirements, that is, to adjust at least one of the finger mechanisms 200 to work. In addition, the support plate 100 is provided with a support plate strap 120 and is adjustably worn on the wrist of the user by means of the support plate strap 120. Accordingly, the user can wear the support plate 100 more comfortably on the back of the user's hand by adjusting tightness of the support plate strap 120. In other implementations, the splitter 110 may not be arranged on the support plate 100, that is, the main wiring harnesses 400 are connected to the respective sub-wiring harnesses 231 through other structures or directly. Also, adjustment for the connection relationship between the sub-wiring harness 231 and the main wiring harness 400 may be achieved through other structures or by the temperature control system.

Figure 3:
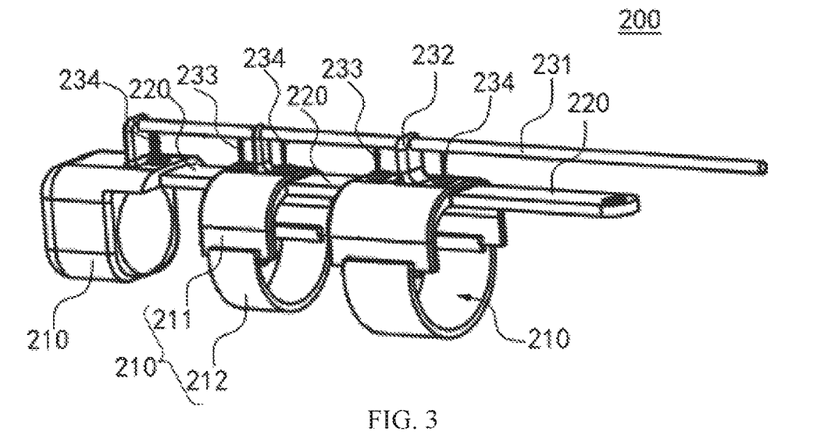
FIG. 3 is a schematic structural view of a finger mechanism of the exoskeleton robot as shown in FIG. 1.
Figure 4:
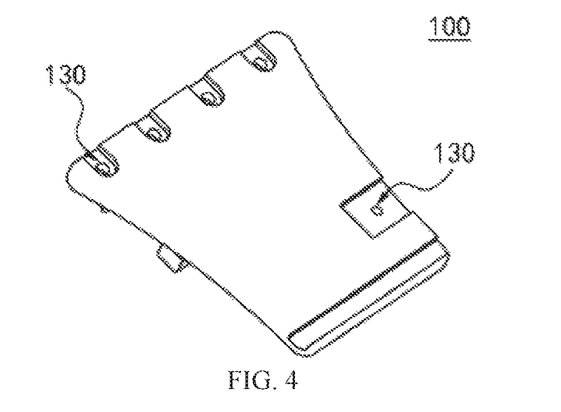
FIG. 4 is a schematic structural view of a support plate of the exoskeleton robot as shown in FIG. 1.

As shown in FIG. 1 to FIG. 3, in this implementation, five finger mechanisms 200 are used to be worn on respective ones of the user's fingers. Each finger mechanism 200 includes a plurality of finger sleeves 210 and a plurality of joint drivers 220. The five finger mechanisms 200 are slightly different from one another in structure due to different physiological structures of the fingers of the human body. For example, the finger mechanism 200 worn on a thumb includes two finger sleeves 210 and two joint drivers 220, and each of the finger mechanisms 200 worn on the other four fingers (index, middle, ring, and little fingers) includes three finger sleeves 210 and three joint drivers 220.

Specifically, as shown in FIG. 1 to FIG. 3, in this implementation, when the finger mechanism 200 corresponds to any of the index finger, the middle finger, the ring finger, and the little finger of the user, each finger mechanism 200 includes three finger sleeves 210 and three joint drivers 220. The three finger sleeves 210 are respectively a proximal finger sleeve 2101, a distal finger sleeve 2102, and a finger end sleeve 2103, which are sequentially arranged at a distance. The three joint drivers 220 are respectively a palmar finger joint driver 220 connected between the support plate 100 and the proximal finger sleeve 2101, a proximal finger joint driver 220 connected between the proximal finger sleeve 2101 and the distal finger sleeve 2102, and a distal finger joint driver 220 connected between the distal finger sleeve 2102 and the finger end sleeve 2103.

Furthermore, as shown in FIGS. 1 and 2, in this implementation, when the finger mechanism 200 corresponds to the thumb of the user, the finger mechanism 200 includes two finger sleeves 210 and two joint drivers 220. The two finger sleeves 210 are respectively the proximal finger sleeve 2101 and the finger end sleeve 2103, which are sequentially arranged at a distance. The two joint drivers 220 are respectively a palmar finger joint driver 220 connected between the support plate 100 and the proximal finger sleeve 2101 and a distal finger joint driver 220 connected between the finger end sleeve 2103 and the proximal finger sleeve 2101.

As shown in FIG. 1 to FIG. 3, in this implementation, a number of the finger sleeves 210 of each finger mechanism 200 is the same as a number of the knuckles of the fingers that are sleeved. A plurality of finger sleeves 210 are sequentially arranged at a distance and are configured to be correspondingly worn on the plurality of knuckles of the finger of the user. Every two adjacent finger sleeves 210 of each finger mechanism 200 is connected by a joint driver 220, and the support plate 100 and a finger sleeve 210 closest to the support plate 100 are connected by a joint driver 220. The joint driver 220 is configured to be switched between a flat state and a bent state in order to correspond to the straightness and curvature of the user's finger joint when the temperature is above or below a phase change temperature value.

In this implementation, the temperature control system is electrically connected to the joint drivers 220 (for example, through the main wiring harness 400 and the sub-wiring harnesses 231), for respectively controlling the temperatures of the respective joint drivers 220, so as to respectively control the respective finger mechanisms 200 such that training of the user's fingers can be achieved.

Through the above design of the present disclosure, the exoskeleton robot proposed by the present disclosure is made of smart materials having a memory performance. The joint driver 220, made from two-way shape memory alloy, is used as a bionic finger joint of the exoskeleton robot. Each of the joint drivers 220 is independently controlled such that a bending motion, and returning and upright movement, of the joint driver 220 can be achieved, so as to drive the five finger joints to complete the stretching/buckling rehabilitation training movement, which may perform rehabilitation training for a single finger joint and also for all joints simultaneously.

Figure 8:
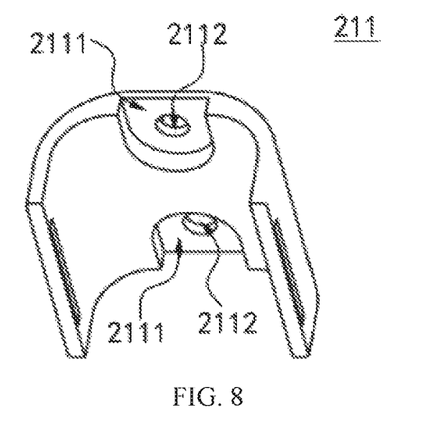
FIG. 8 is a schematic structural view of a finger sleeve of the exoskeleton robot as shown in FIG. 1.

Further, as shown in FIG. 3 and FIG. 8, in this implementation, the proximal finger sleeve 2101 mainly includes a buckle plate 211 and a finger sleeve strap 212. The buckle plate 211 has a semi-tubular structure for buckling root knuckles of the user's fingers, and the buckle plate 211 may be adjustably worn on the knuckles of the user's fingers through the finger sleeve strap 212. Accordingly, the user can wear the finger sleeve 210 more comfortably on the user's knuckles by adjusting the tightness of the finger sleeve strap 212.

Similarly, as shown in FIG. 3 and FIG. 8, in this implementation, the distal finger sleeve 2102 mainly includes a buckle plate 211 and a finger sleeve strap 212. The buckle plate 211 has a semi-tubular structure for buckling the middle knuckles of the user's fingers, and the buckle plate 211 is adjustably worn on the knuckles of the user's fingers through the finger sleeve strap 212.

Further, as shown in FIG. 3, in this implementation, the finger end sleeve 2103 has a substantially tubular structure for buckling the end knuckles of the user's fingers.

Figure 6:
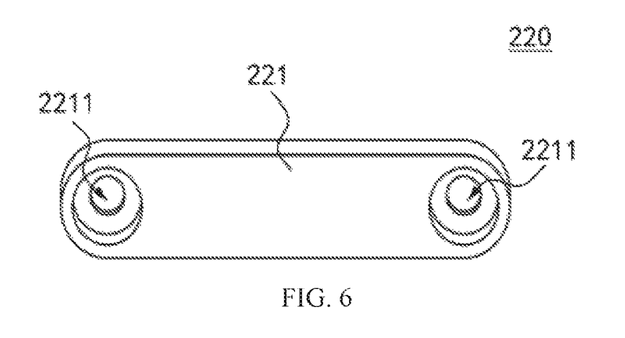
FIG. 6 is a schematic structural view of the exoskeleton robot having a joint driver in a flat state as shown in FIG. 1.
Figure 7:
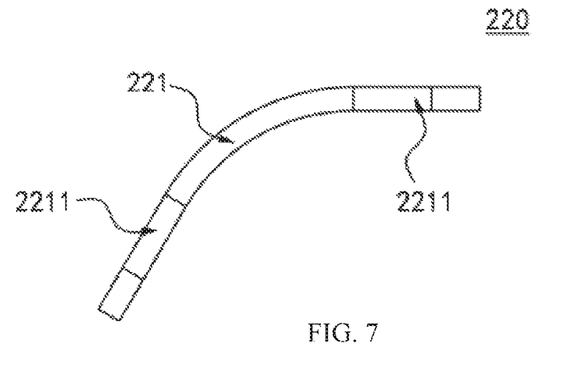
FIG. 7 is a schematic structural view of the exoskeleton robot having the joint driver in a curved state as shown in FIG. 1.

Further, as shown in FIGS. 3, 6, and 7, in this implementation, the joint driver 220 mainly includes a connecting plate 221. For one finger mechanism 200, the connecting plate 221 is connected between the two finger sleeves 210 adjacent to each other, or is connected between the support plate 100 and a finger sleeve 210 closest to the support plate 100. The material of the connecting plate 221 is a two-way shape memory alloy. When the temperature of the connecting plate 221 is higher than the phase change temperature value of the two-way shape memory alloy, the connecting plate 221 is in a curved state and has an internal structure in an austenitic state. When the temperature of the connecting plate 221 is lower than the phase change temperature value of the two-way shape memory alloy, the connecting plate 221 is in a flat state and has an internal structure in a martensitic state. Accordingly, the temperature control system electrically connected to the connecting plate 221 can change the temperature by changing magnitude of the current flowing into the connecting plate 221, so as to control the connecting plate 221 to be switched between the flat state and the curved state. The temperature control system can control a deformation state of the respective connecting plates 221 corresponding to the respective finger joints of the user by independently controlling the temperature of the respective connecting plates 221 of the respective finger mechanisms 200, so as to separately simulate physiological actions of the respective finger joints. In addition, as the deformation of the two-way shape memory alloy is the phase change of the internal structure, a deformation amount and driving force are generated, and a deformation rate is relatively gentle, rather than instantaneously changed, which is suitable for the driving action of the human finger and avoids muscle damage of the fingers caused by sudden deformation.

Further, in this implementation, based on such design as the first groove 130 of the support plate 100 and the second groove 2111 of the finger sleeve 210, the width of the first groove 130 is preferably equal to the size of the end of the connecting plate 221 connected to the support plate 100, and the width of the second groove 2111 is preferably equal to the size of the end of the connecting plate 221 connected to the finger sleeve 210. Accordingly, it can prevent the connecting plate 221 from rotating relative to the support plate 100 or the finger sleeve 210.

Further, in this implementation, the joint driver 220 further includes a flexible thermal insulation film. Specifically, the flexible thermal insulation film is preferably provided on the lower surface of the connecting plate 221 towards the user's finger. Accordingly, the flexible thermal insulation film can block heat from transferring to the user's fingers during the joint driver 220 is deformed by heat, so as to prevent occurrence of low temperature burning.

Further, in this implementation, the joint driver 220 also includes an insulating layer that is disposed on the surface of the connecting plate 221. Accordingly, based on the design in which the temperature control system controls the temperature of the connecting plate 221, by changing magnitude of the current flowing into the connecting plate 221, the arrangement of the insulating layer can provide an insulation protection between the connecting plate 221 and the user's fingers.

Further, in this implementation, the phase change temperature value of the connecting plate 221 of the joint driver 220, that is, the phase change temperature value of the two-way shape memory alloy in this implementation is preferably 40° C. to 50° C. Accordingly, the above-mentioned range of the phase change temperature value is relatively close to the normal physiological temperature of the human body, which avoids burning caused by too-high temperatures. At the same time, since the temperature of the human body is about 36.5° C., under consideration of ambient temperature of the four seasons, the phase change temperature is set in a range of 40° C. to 50° C. On the one hand, the temperature value of the two-way shape memory alloy is not required to be too high to generate deformation and, on the other hand, the temperature value is not too low to cause influence of ambient temperature on the working state.

Furthermore, in this implementation, in a thermal treatment process for maximum bending deformation of the two-way shape memory alloy, the deformation of the two-way shape memory alloy is controlled in combination with the maximum deformation as the fingers are bent, preferably by using a bionic principle, such that the bent deformation is made within the human fingers' movement. On the one hand, the deformation is too small to achieve the purpose of rehabilitation training, and on the other hand, the deformation is too large to damage the fingers.

Further, as shown in FIG. 4, in this implementation, five first grooves 130 are opened on the lower surface of the support plate 100 facing the back of the user's hand. The first grooves 130 respectively correspond to the finger mechanisms 200. One end of the connecting plate 221 is detachably fixed into the first groove 130 of the support plate and such fixing relationship may be achieved preferably by using a fixing element, such as a locking screw. Similarly, as shown in FIG. 8, in this implementation, the two second grooves 2111 are respectively opened on the lower surfaces of the opposite positions of the two finger sleeves 210 adjacent to each other. The two ends of the connecting plate 221 are detachably fixed into the second groove 21111 of the two finger sleeves 210, respectably, and such fixing relationship can be achieved preferably by using a fixing element, such as a locking screw.

Further, as shown in FIG. 3, in this implementation, each of the finger mechanisms 200 also includes a sub-wiring harness 231 electrically connected to the temperature control system. Each of the connecting plates 221 has a positive electrode lead 233 and a negative electrode lead 234 on both ends thereof, respectively. The positive electrode lead 233 and the negative electrode lead 234 are connected to the sub-wiring harness 231, respectively. Specifically, a first wire hole 2112 is formed on the bottom of the second recess 2111 of the finger sleeve 210, and a second wire hole 2211 corresponding to the first wire hole 2112 is formed on the end of the connecting plate 221, and the positive electrode lead 223 or the negative electrode lead 234 of the connecting plate 221 is connected to the sub-wiring harness 231 of the finger mechanism 200 through the first wire hole 2112 and the second wire hole 2211. Similarly, as shown in FIG. 4, in this implementation, a wire hole is formed on the bottom of the first groove 130 of the support plate 100, as substantially the same as the above-described design in the function and structure, the repetition of which will be omitted herein.

Figure 5:
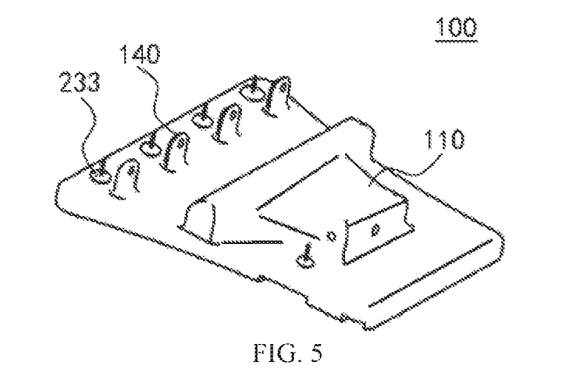
FIG. 5 is a structural schematic view of a support in another view as shown in FIG. 4.

Furthermore, as shown in FIG. 3, based on such a design that each of the finger mechanisms 200 includes the sub-wiring harness 231, in this implementation, a second projection 232 is protruded from the upper surface of each of the finger sleeves 210. Each sub-wiring harness 231 of the finger mechanism 200 is disposed through the second projections 232 of the respective finger sleeves 210 of the finger mechanism 200. The positive electrode lead 233 and the negative electrode lead 234 of the connecting plate 221 respectively pass through the finger sleeve 210 and are connected to the sub-wiring harness 231. Similarly, as shown in FIG. 5, in this implementation, a first projection 140 is protruded from the upper surface of the support plate 100, as substantially the same as the above design in the function and structure, which will be omitted herein.

Figure 9:
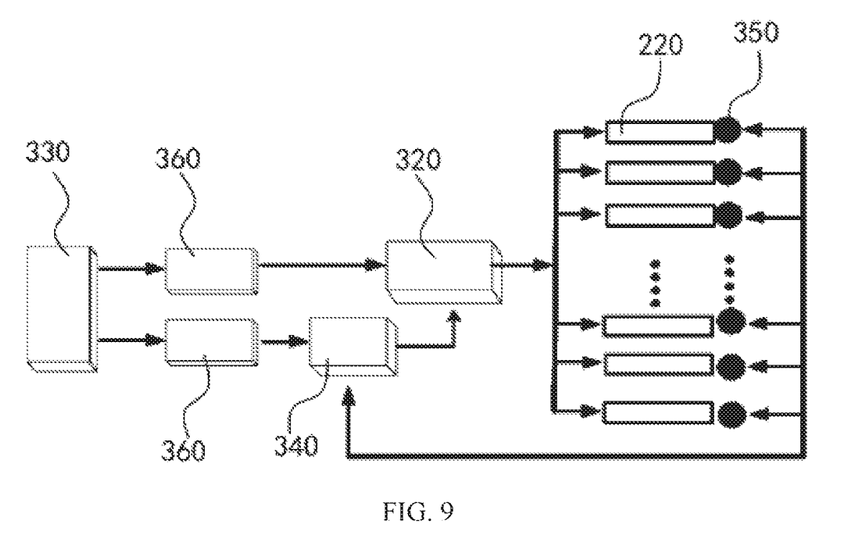
FIG. 9 is a control principle diagram of the exoskeleton robot as shown in FIG. 1.

As shown in FIG. 9, in this implementation, the temperature control system mainly includes a drive circuit 320, a power supply 330, and a controller 340. The drive circuit 320 is electrically connected to the respective joint drivers 220, respectively. The power supply 330 is electrically connected to the drive circuit 320 for respectively heating the respective joint drivers 220 by the drive circuit 320. The controller 340 is electrically connected to the drive circuit 320 and the power supply 330, respectively, for heating of the joint driver 220 by controlling the drive circuit 320. Specifically, the drive circuit 320 may be electrically connected to the positive electrode lead 233 and the negative electrode lead 234 of the respective joint drivers 220 through the main wiring harness 400 and sub-wiring harness 231, so that the respective joint drivers 220 can be independently controlled by the temperature control system.

Further, as shown in FIG. 9, in this implementation, the temperature control system preferably includes a plurality of temperature sensors 350. The plurality of temperature sensors 350 are correspondingly disposed in a plurality of joint drivers 220. The temperature sensors 350 are electrically connected to the controller 340 for collecting the temperatures of the joint drivers 220. Accordingly, the controller 340 can control the drive circuit 320 to heat the joint driver 220 according to the temperature of the joint drivers 220 collected by the temperature sensors 350.

Further, as shown in FIG. 9, in this implementation, the power supply 330 and the drive circuit 320 are connected preferably by a voltage reduction and regulation circuit 360.

Similarly, as shown in FIG. 9, in this implementation, the power supply 330 and the controller 340 are connected preferably by the voltage reduction and regulation circuit 360.

Further, in this implementation, for a bending action frequency and a bending angle of each connecting plate 221, a reasonable suggestion may be given according to conditions at different positions of the user's finger, and then the bending action frequency and the bending angle as desired can be achieved according to program commands of the controller 340, and the controller 340 may adopt different program modes according to different users and different disease conditions.

Further, as shown in FIG. 1 and FIG. 2, in this implementation, the temperature control system further includes a temperature control box 310. The temperature control box 310 can be worn on the user's wrist or arm. The drive circuit 320, the power supply 330, and the controller 340 are respectively disposed in the temperature control box 310.

Furthermore, as shown in FIG. 1 and FIG. 2, in this implementation, the temperature control box 310 is preferably provided with a temperature control box strap 311, so that the temperature control box 310 may be adjusted by the temperature control box strap 311 to be worn on the user's wrist or arm. Accordingly, the temperature control box 310 may be more comfortably worn on the user's wrist or arm by adjusting the tightness of the temperature control box strap 311.

As above described, as an example of a finger unit corresponding to the finger, its work principle is generally presented as follows:

When the three joint drives are supplied by current via PWM signal such that the internal temperature thereof reaches the phase change temperature value, the internal organization structure of the connecting plate made of the two-way shape memory alloy starts being transformed from martensite to austenite, the connecting plate begins a bending movement to drive the corresponding knuckles of the user's fingers to perform a bending movement. When the three joint drivers are powered off, the temperature of the connecting plate made of the two-way shape memory alloy is lowered below the phase change temperature value, and the connecting plate starts to restore to the original flat state to drive the user's fingers to perform bending movement. It may be helpful for the user whose fingers do not have active movement ability to complete stretching/retracting movement of the muscles by driving the bending/stretching movement of the knuckles of the user's fingers in group to prevent symptoms, such as muscle weakness and atrophy, from occurring in the hand muscles, which may be caused due to the hand muscles being bent and in a collapsed state over a long period of time.

It should be noted herein that the exoskeleton robots as shown in the drawings and described in this specification are merely a few examples of the exoskeleton robots of many types capable of using the principles of the present disclosure. It should be clearly understood that the principle of the present disclosure are not absolutely limited to any detail or any component of the exoskeleton robot as shown in the drawings or as described in this specification.

As above described, the exoskeleton robot as proposed by the present disclosure, based on such a design that the joint drivers are switched between the flat state and the curved state when the temperature of the joint drivers is higher than or lower than the phase changer temperature value, to respectively correspond to flatness and curvature of the user's finger joints, has joint drivers made from smart materials having memory performance, i.e., the two-way shape memory alloy, as bionic finger joints of the exoskeleton robot. The respective joint drivers are independently controlled to carry out bending movement and returning upright movement, such that the five finger joints can be driven to complete the stretching/bending rehabilitation training movement. This can perform rehabilitation training to the single finger joint as well as to all finger joints simultaneously. The finger exoskeleton robot of the present disclosure has an advantage of simple wearable structure, light weight, safety, and great adaptability, and is particularly suitable for functional rehabilitation training treatment of the hemiplegic patients with hand joint diseases and the patients injured after sports.

Example embodiments of the absorption shielding means and the evaporation device having the absorption shielding means as proposed by the present disclosure are described and/or illustrated in detail. However, the embodiments of the present disclosure are not limited to the specific embodiments as described herein. Rather, the constituents and/or steps of each embodiment may be used independently and separately from the other constituents and/or steps as described herein. Each constituent and/or step of one embodiment may also be used in combination with other constituents and/or steps of the other embodiments. As introducing the elements/constituents and the like as described and/or shown in the drawings, the terms "a", "an", "the", "said", and "at least one", when describing an element, constituent, or the like as described and/or shown herein, are used to express the presence of one or more of the elements, constituents, or the like. The terms "include", "comprise", and "have", as used herein, are intended to be inclusive, and mean there may be additional elements, constituents, or the like other than the listed elements, constituents, or the like. In addition, the words "first", "second", or the like, as used in claims, are meant to identify, but not to limit, the object they modify.

Although the exoskeleton robot as proposed by the present disclosure is disclosed according to different particular embodiments, those skilled in the art would recognize that the implementations of present disclosure can be modified within the spirit and scope of the claims.

What is claimed is:

1. A finger exoskeleton robot, comprising:
    a support plate configured to be worn on a back of a hand of a user, wherein the support plate is trapezoidal;
    at least one finger mechanism, the at least one finger mechanism being configured to be worn on at least one of a plurality of fingers of the user, the at least one finger mechanism comprising:
        a plurality of finger sleeves sequentially arranged at a distance and configured to be correspondingly worn on a plurality of knuckles of the fingers of the user; and
        a plurality of joint drivers respectively connected between the two finger sleeves adjacent to each other, and connected between the support plate and one of the finger sleeves closest to the support plate, the joint drivers being configured to be switched between a flat state and a curved state when a temperature of the joint drivers is higher than or lower than a phase change temperature value; and
    a temperature control system electrically connected to each of the joint drivers and configured to control the temperature of the joint drivers, wherein:
    a first groove is opened on a lower surface of the support plate facing the back of the hand;
    a second groove opposite to the first groove is opened on a lower surface of a respective one of the finger sleeves facing the finger of the at least one finger mechanism adjacent to the support plate; and
    two ends of the a respective one of the joint drivers are detachably fixed in the first groove and the second groove, respectively.

2. The finger exoskeleton robot according to claim 1, wherein respective ones of the joint drivers comprise a connecting plate connected between the two finger sleeves adjacent to each other or connected between the support plate and one of the finger sleeves closest to the support plate.

3. The finger exoskeleton robot according to claim 2, wherein the connecting plate is made of a two-way shape memory alloy.

4. The finger exoskeleton robot according to claim 1, wherein the phase change temperature value is 40° C. to 50° C.

5. The finger exoskeleton robot according to claim 1, wherein two second grooves are respectively opened on the lower surfaces of the opposite positions of the two finger sleeves adjacent to each other facing to the fingers, and the two ends of the joint drivers are detachably fixed in the second grooves of the two finger sleeves, respectively.

6. The finger exoskeleton robot according to claim 1, wherein the at least one finger mechanism further comprises a sub-wiring harness electrically connected to the temperature control system, each of the joint drivers has a positive electrode lead and a negative electrode lead respectively on the ends, and the positive electrode lead and the negative electrode lead are respectively connected to the sub-wiring harness.

7. The finger exoskeleton robot according to claim 6, wherein a first projection is protruded from an upper surface of the support plate facing away from the back of the hand, a number and position of the first projection corresponding to that of the at least one finger mechanism, and the sub-wiring harness of the at least one finger mechanism is arranged through the corresponding first projection.

8. The finger exoskeleton robot according to claim 6, wherein a second projection is protruded from an upper surface of the finger sleeve facing away from the finger, and the sub-wiring harness of the at least one finger mechanism is arranged through the plurality of the second projections of the at least one finger mechanism, and the positive electrode lead and the negative electrode lead of each of the joint drivers respectively pass through the finger sleeve and are connected to the sub-wiring harness.

9. The finger exoskeleton robot according to claim 6, wherein the support plate is provided with a splitter, and a main wiring harness is connected between the splitter and the temperature control system, and the sub-wiring harnesses of the at least one finger mechanism are respectively connected to the splitter, wherein the splitter is configured to selectively connect at least one of the plurality of sub-wiring harnesses to the main wiring harness.

10. The finger exoskeleton robot according to claim 1, wherein the support plate is provided with a support plate strap, through which the support plate is adjustably worn on a wrist of the user.

11. The finger exoskeleton robot according to claim 1, wherein the temperature control system comprises:
   a drive circuit electrically connected to the joint drivers;
   a power supply electrically connected to the drive circuit, the power supply being configured to heat the joint drivers through the drive circuit; and
   a controller electrically connected to the drive circuit and the power supply, the controller being configured to control the drive circuit to heat the joint drivers.

12. The finger exoskeleton robot according to claim 11, wherein the temperature control system further comprises:
   a plurality of temperature sensors, which are correspondingly disposed in the plurality of the joint drivers, and the temperature sensors are electrically connected to the controller to separately collect the temperature of the joint drivers;
   wherein the controller is configured to control the drive circuit to heat the joint drivers according to the temperature of the joint drivers collected by the temperature sensors.

13. The finger exoskeleton robot according to claim 11, wherein the power supply and the drive circuit are connected through a voltage reduction and regulation circuit; or the power supply and the controller are connected through the voltage reduction and regulation circuit.

14. The finger exoskeleton robot according to claim 11, wherein the temperature control system further comprises a temperature control box configured to be worn on a wrist or an arm of the user, the drive circuit, the power supply, and the controller being respectively disposed in the temperature control box.

15. The finger exoskeleton robot according to claim 1, wherein:
   the at least one finger mechanism is a plurality of finger mechanisms;
   each of the finger mechanisms comprise three of the finger sleeves and three of the joint drivers when the finger mechanism correspond to any one of an index finger, middle finger, ring finger, and little finger of the user;
   the three finger sleeves are respectively a proximal finger sleeve, a distal finger sleeve and a finger end sleeve sequentially arranged at a distance; and
   the three joint drivers are respectively a palmar joint driver connected between the support plate and the finger sleeve, a proximal finger joint driver connected between the proximal finger sleeve and the distal finger sleeve, and a distal finger joint driver connected between the distal finger sleeve and the finger end sleeve.

16. The finger exoskeleton robot according to claim 1, wherein:
   the at least one finger mechanism comprises two of the finger sleeves and two of the joint drivers in case that the finger mechanism corresponds to a thumb of the user;
   the two finger sleeves are respectively a proximal finger sleeve and a finger end sleeve sequentially arranged at a distance; and
   the two joint drivers are respectively a palmar joint driver connected between the support plate and the proximal finger sleeve and a distal finger joint driver connected between the finger end sleeve and the proximal finger sleeve.

17. The finger exoskeleton robot according to claim 15, wherein the proximal finger sleeve comprises:
   a buckle plate having a semi-tubular structure for buckling the knuckles of the fingers of the user;
   a finger sleeve strap through which the buckle plate is adjustably worn on the knuckles of the fingers of the user; and
   the finger end sleeve having a tubular structure for being sleeved on the knuckles of the fingers of the user.

18. The finger exoskeleton robot according to claim 16, wherein the proximal finger sleeve comprises:
   a buckle plate having a semi-tubular structure for buckling the knuckles of the fingers of the user;
   a finger sleeve strap through which the buckle plate is adjustably worn on the knuckles of the fingers of the user; and
   the finger end sleeve having a tubular structure for being sleeved on the knuckles of the fingers of the user.

19. The finger exoskeleton robot according to claim 15, wherein the distal finger sleeve comprises:
   a buckle plate having a semi-tubular structure for buckling the knuckle of the fingers of the user; and
   a finger sleeve strap, through which the buckle plate is adjustably worn on the knuckles of the fingers of the user.

20. A finger exoskeleton robot, comprising:
   a support plate configured to be worn on a back of a hand of a user, wherein the support plate is trapezoidal;
   at least one finger mechanism, the at least one finger mechanism being configured to be worn on at least one of a plurality of fingers of the user, the at least one finger mechanism comprising:
      a plurality of finger sleeves sequentially arranged at a distance and configured to be correspondingly worn on a plurality of knuckles of the fingers of the user; and
      a plurality of joint drivers respectively connected between the two finger sleeves adjacent to each other, and connected between the support plate and one of the finger sleeves closest to the support plate, the joint drivers being configured to be switched between a flat state and a curved state when a temperature of the joint drivers is higher than or lower than a phase change temperature value; and a temperature control system electrically connected to each of the joint drivers and configured to control the temperature of the joint drivers,
wherein the at least one finger mechanism further comprises a sub-wiring harness electrically connected to the temperature control system, each of the joint drivers has a positive electrode lead and a negative electrode lead respectively on the ends, and the positive electrode lead and the negative electrode lead are respectively connected to the sub-wiring harness.

* * * * *